United States Patent
Schneider

(10) Patent No.: US 10,488,541 B2
(45) Date of Patent: Nov. 26, 2019

(54) DYNAMICALLY CONTROLLED FOIL SYSTEMS AND METHODS

(71) Applicant: ION Geophysical Corporation, Houston, TX (US)

(72) Inventor: Curt Schneider, Houston, TX (US)

(73) Assignee: ION Geophysical Corporation, Houston, TX (US)

( * ) Notice: Subject to any disclaimer, the term of this patent is extended or adjusted under 35 U.S.C. 154(b) by 411 days.

(21) Appl. No.: 15/295,481

(22) Filed: Oct. 17, 2016

(65) Prior Publication Data

US 2017/0106946 A1 Apr. 20, 2017

Related U.S. Application Data

(60) Provisional application No. 62/242,142, filed on Oct. 15, 2015.

(51) Int. Cl.
*B63B 21/66* (2006.01)
*G01V 1/38* (2006.01)
*B63G 8/42* (2006.01)

(52) U.S. Cl.
CPC ............ *G01V 1/3826* (2013.01); *B63B 21/66* (2013.01); *G01V 1/3817* (2013.01); *B63B 2211/02* (2013.01); *B63G 8/42* (2013.01)

(58) Field of Classification Search
CPC ...... G01V 1/3826; G01V 1/3817; B63G 8/42; B63B 21/66; B63B 2211/02
See application file for complete search history.

(56) References Cited

U.S. PATENT DOCUMENTS

| | | |
|---|---|---|
| 2,435,956 A | 2/1948 | Craig |
| 2,523,925 A | 9/1950 | Sorensen |

(Continued)

FOREIGN PATENT DOCUMENTS

| | | |
|---|---|---|
| CN | 1355750 A | 6/2002 |
| CN | 1954239 A | 4/2007 |

(Continued)

OTHER PUBLICATIONS

Extended European Search Report dated Sep. 16, 2015 in connection with European Patent Application No. 12844247.2, 5 pages.

(Continued)

*Primary Examiner* — S. Joseph Morano
*Assistant Examiner* — Jovon E Hayes
(74) *Attorney, Agent, or Firm* — Dorsey & Whitney LLP

(57) ABSTRACT

Foil systems for steering source and receiver arrangements for gathering seismic data are connected to buoys supporting seismic sources and receivers. Each foil system includes a positive buoyancy device, a pair of control cables, a plurality of foil sections, and an actuator. The pair of control cables may be attached to the buoyancy device and extend downward from the buoyancy device to a submerged end. The plurality of foil sections may be disposed along the control cables between the buoyancy device and the submerged end. The actuator may be configured to adjust attack angles of the foil sections by changing a tension in one or both of the control cables. Steering control is provided through a number of modes described by data distributed through a control system in communication with the foil systems.

29 Claims, 10 Drawing Sheets

(56) References Cited

U.S. PATENT DOCUMENTS

| | | | |
|---|---|---|---|
| 2,914,878 A | 12/1959 | Sterner et al. | |
| 3,943,483 A * | 3/1976 | Strange | G01V 1/3826 367/17 |
| 4,180,935 A | 1/1980 | Goudey et al. | |
| 4,365,574 A | 12/1982 | Norminton | |
| 4,404,664 A | 9/1983 | Zachariadis | |
| 4,484,534 A * | 11/1984 | Thillaye du Boullay | A01K 73/045 114/244 |
| 4,514,924 A | 5/1985 | Ojserkis et al. | |
| 4,567,841 A | 2/1986 | Hale | |
| 4,823,325 A | 4/1989 | Cole, Jr. | |
| 4,829,929 A | 5/1989 | Kerfoot | |
| 5,444,933 A | 8/1995 | Kinoshita et al. | |
| 6,016,286 A * | 1/2000 | Olivier | G01V 1/3826 367/17 |
| 6,131,327 A | 10/2000 | Larsen | |
| 6,144,342 A | 11/2000 | Bertheas et al. | |
| 6,189,475 B1 | 2/2001 | Coakley | |
| 6,226,225 B1 | 5/2001 | Barker et al. | |
| 6,453,597 B1 | 9/2002 | Kirkpatrick | |
| 6,504,792 B2 | 1/2003 | Barker et al. | |
| 6,532,189 B2 * | 3/2003 | Barker | B63B 21/66 114/244 |
| 6,655,311 B1 * | 12/2003 | Martin | F15D 1/12 114/242 |
| 6,671,223 B2 | 12/2003 | Bittleston | |
| 6,691,038 B2 | 2/2004 | Zajac et al. | |
| 6,837,175 B1 | 1/2005 | Gieseke | |
| 6,932,017 B1 | 8/2005 | Bittleston et al. | |
| 7,080,607 B2 | 7/2006 | Bittleston et al. | |
| 7,162,967 B2 | 1/2007 | Bittleston et al. | |
| 7,222,579 B2 | 5/2007 | Bittleston et al. | |
| 7,293,520 B2 | 11/2007 | Bittleston et al. | |
| 7,380,513 B2 * | 6/2008 | Lie | F16L 1/123 114/244 |
| 7,404,370 B2 | 7/2008 | Stokkeland | |
| 7,499,373 B2 | 3/2009 | Toennessen | |
| 7,577,060 B2 * | 8/2009 | Toennessen | B63B 21/663 114/253 |
| 7,738,317 B2 * | 6/2010 | Toennessen | G01V 1/3861 367/16 |
| 7,755,970 B2 | 7/2010 | Welker et al. | |
| 7,793,606 B2 | 9/2010 | Olivier et al. | |
| 8,230,801 B2 | 7/2012 | Bittleston et al. | |
| 8,391,101 B2 * | 3/2013 | Brewer | G01V 1/3817 367/16 |
| 8,391,102 B2 | 3/2013 | Hobo et al. | |
| 8,593,905 B2 * | 11/2013 | Gagliardi | G01V 1/38 367/20 |
| 8,743,655 B2 | 6/2014 | Bittleston et al. | |
| 8,897,094 B2 * | 11/2014 | Eick | G01V 1/20 367/17 |
| 8,997,675 B2 * | 4/2015 | MacQuin | B63B 21/66 114/244 |
| 9,075,165 B2 | 7/2015 | Vageskar et al. | |
| 9,151,859 B2 | 10/2015 | Martin | |
| 9,211,940 B2 | 12/2015 | Richer De Forges | |
| 9,221,524 B2 | 12/2015 | Richer De Forges | |
| 9,244,184 B2 * | 1/2016 | Voldsbekk | G01V 1/38 |
| 9,244,187 B2 | 1/2016 | Berentzen et al. | |
| 9,494,703 B2 * | 11/2016 | Enerhaug | G01V 1/3826 |
| 9,581,714 B2 | 2/2017 | Barral et al. | |
| 9,632,195 B2 | 4/2017 | Martin | |
| 9,676,454 B2 | 6/2017 | Simonnot et al. | |
| 9,880,308 B2 * | 1/2018 | Steinsland | G01V 3/15 |
| 2006/0176775 A1 * | 8/2006 | Toennessen | G01V 1/3826 367/16 |
| 2008/0029012 A1 * | 2/2008 | Stokkeland | G01V 1/3826 114/253 |
| 2010/0149910 A1 * | 6/2010 | Martin | G01V 1/3826 367/17 |
| 2010/0226204 A1 * | 9/2010 | Gagliardi | G01V 1/38 367/16 |
| 2011/0103179 A1 * | 5/2011 | Vageskar | G01V 1/3808 367/17 |
| 2011/0203509 A1 * | 8/2011 | Austad | G01V 1/38 114/244 |
| 2012/0067265 A1 * | 3/2012 | Valo | B63B 21/66 114/253 |
| 2013/0182531 A1 | 7/2013 | Galgiardi et al. | |
| 2014/0104985 A1 * | 4/2014 | Gagliardi | G01V 1/38 367/21 |
| 2014/0140169 A1 * | 5/2014 | Cambois | G01V 1/3826 367/16 |
| 2014/0247691 A1 * | 9/2014 | Martin | B63B 21/66 367/16 |
| 2014/0247692 A1 * | 9/2014 | Simonnot | B63B 21/66 367/17 |
| 2014/0269174 A1 * | 9/2014 | Gagliardi | G01V 1/3808 367/15 |
| 2015/0268366 A1 | 9/2015 | Vageskar et al. | |
| 2015/0272094 A1 | 10/2015 | Pearlman | |
| 2016/0161622 A1 * | 6/2016 | Martin | B63B 21/663 114/245 |
| 2017/0106946 A1 * | 4/2017 | Schneider | B63B 21/66 |
| 2017/0199293 A1 * | 7/2017 | Marshall | G01V 1/3826 |
| 2017/0233040 A1 * | 8/2017 | Martin | B63B 21/66 367/17 |
| 2018/0027784 A1 | 2/2018 | Martin | |

FOREIGN PATENT DOCUMENTS

| | | |
|---|---|---|
| CN | 102103214 A | 6/2011 |
| CN | 102483464 A | 5/2012 |
| CN | 103129414 A | 6/2013 |
| DE | 3933398 A1 | 4/1991 |
| EP | 0884607 A2 | 12/1998 |
| EP | 2317341 A2 | 5/2011 |
| EP | 2776863 B1 | 2/2015 |
| ES | 1018874 U | 2/1992 |
| GB | 108761 A | 8/1917 |
| GB | 282520 A | 12/1927 |
| GB | 682349 A | 11/1952 |
| GB | 693238 A | 6/1953 |
| GB | 2342081 A | 4/2000 |
| GB | 2400662 B | 10/2004 |
| GB | 2492652 A | 1/2013 |
| WO | 9516344 A1 | 6/1995 |
| WO | 0076839 A1 | 12/2000 |
| WO | 2010111377 A2 | 9/2010 |
| WO | 2013059926 A1 | 5/2013 |
| WO | 2014003573 A2 | 1/2014 |
| WO | 2014145861 A1 | 9/2014 |
| WO | 2016086293 A1 | 6/2016 |
| WO | 2016127245 A1 | 8/2016 |

OTHER PUBLICATIONS

International Preliminary Report on Patentability dated Apr. 29, 2014 in connection with International Patent Application No. PCT/CA2012/000996, 4 pages.

International Search Report and Written Opinion dated May 2, 2013 in connection with International Patent Application No. PCT/CA2012/000996, 6 pages.

Patent Examination Report No. 1 for dated Jun. 24, 2016 in connection with Australian Patent Application No. 2012327836, 2 pages.

The International Search Report and Written Opinion dated Feb. 22, 2016 in connection with International Patent Application No. PCT/CA2015/000593, 7 pages.

First Office Action dated Aug. 10, 2015 in connection with Danish Patent Application No. PA 2014 00278, 7 pages.

Second Office Action dated Mar. 1, 2016 in connection with Danish Patent Application No. PA 2014 00278, 2 pages.

Examination Report dated Nov. 2, 2018 in connection with Australian Patent Application No. 2015358314, 3 pages.

(56) References Cited

OTHER PUBLICATIONS

Examination report dated Jul. 31, 2018 in connection with Canadian patent application No. 2,856,316, 4 pages.
Extended European Search Report dated Oct. 9, 2018 in connection with European Patent Application No. 16748506.9, 11 pages.
International Search Report and Written Opinion dated Jun. 23, 2017 in connection with International Patent Application No. PCT/IB2017/000209, 11 pages.
Office Action dated Mar. 18, 2019 in connection with Danish Patent Application No. PA201870290, 5 pages.
Examination Report dated May 30, 2018 in connection with Danish patent application No. PA201770548, 5 pages.
Extended European Search Report dated Jul. 2, 2018 in connection with European Patent Application No. 15864979.8, 6 pages.
First Office Action and Search Report dated May 30, 2018 in connection with Chinese Patent Application No. 201580075529.2, 8 pages including English translation.
First examination report dated Jul. 9, 2018 in connection with Danish Patent Application No. PA201770675, 5 pages.
International Search Report and Written Opinion dated Jan. 24, 2017 in connection with International Patent Application No. PCT/US2016/057344, 13 pages.
First Office Action dated May 30, 2019 in connection with Chinese Patent Application No. 201680074025.3, 23 pages including English translation.
Extended European Search Report dated Aug. 14, 2019 in connection with European Patent Application No. 17752738.9, 9 pages.
Second office action dated Aug. 16, 2019 in connection with Danish patent application No. PA201770548, 2 pages.

\* cited by examiner

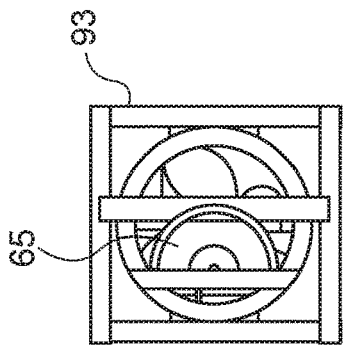
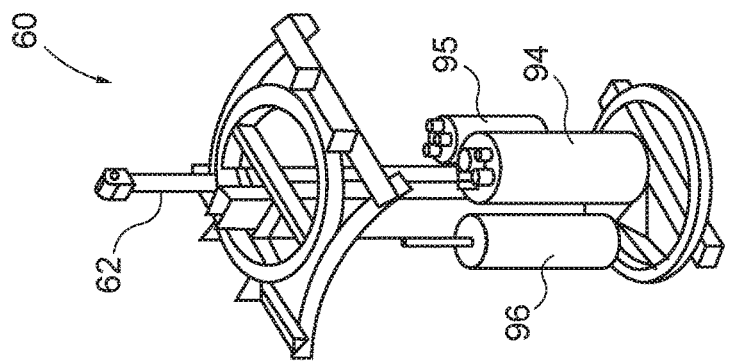
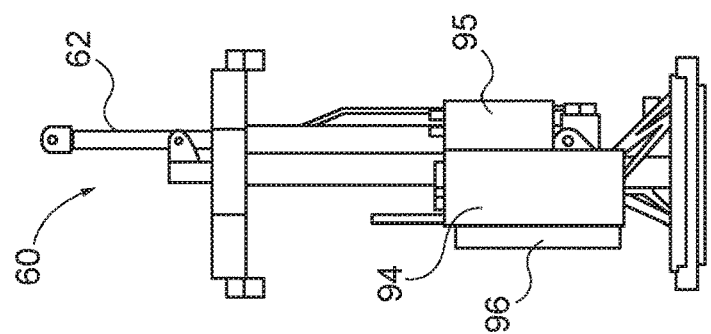
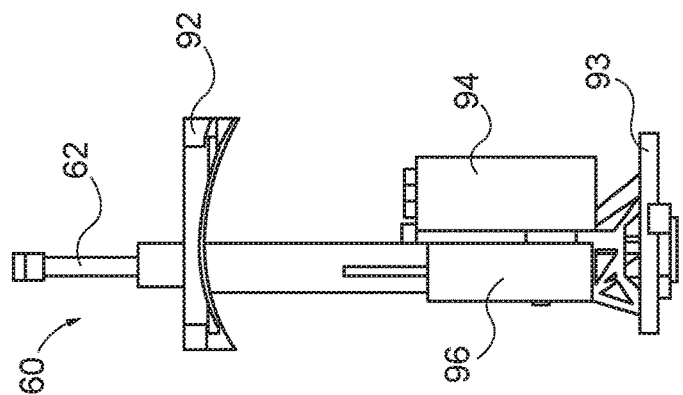
FIG. 10D
FIG. 10C
FIG. 10B
FIG. 10A

SINGLE SOURCE CONFIGURATIONS

MULTI-SOURCE CONFIGURATIONS

DYNAMICALLY CONTROLLED FOIL SYSTEMS AND METHODS

CROSS REFERENCE TO RELATED APPLICATIONS

This application claims priority under 35 U.S.C. § 119(e) to U.S. provisional application No. 62/242,142 filed 15 Oct. 2015 and entitled "Dynamically controlled foil systems and methods," which is hereby incorporated by reference herein, in its entirety.

BACKGROUND

This disclosure is directed to dynamically controllable foil systems, and to methods for controlling such systems. Applications include, but are not limited to, dynamically controlled foil and hydrofoil systems configured to position and maintain spacing between seismic sources and other elements of a marine seismic array.

Seismic arrays with sources and streamers are used to study rock strata and other structures below the surface, for example, as described in U.S. Patent Publication No. 2014/0247691, which is incorporated by reference herein in its entirety for all purposes. One or more marine vessels are typically used to tow the source and/or receiver arrays, in order to obtain relevant geological data covering a desired surface area of the ocean floor. For example, a single surface vessel may simultaneously tow both a source array and an array of seismic streamers, or different vessels can be used to tow separate source and receiver arrays. Alternatively, a towed source array can be used in conjunction with stationary receivers, for example, an array of ocean-bottom nodes, or with ocean-bottom cables deployed on the seabed.

During operation, acoustic shock waves generated by the source array propagate through the water to penetrate the ocean floor and are reflected from subsurface structures. The reflected acoustic waves are recorded as signals or seismic responses by the receivers, e.g., hydrophones and/or geophones towed behind a vessel or deployed on the ocean floor.

Lateral forces are applied to maintain position and spacing of the seismic sources and other array elements as they are towed behind the vessel. The spacing depends on the number of sources and/or streamer cables that are deployed, and on the spacing between adjacent source and/or receiver components. Typically, a number of source sub-arrays or strings are deployed behind the vessel using a tow rope configuration to spread the sources over lateral distances of approximately ten to one hundred meters or more. Streamer cables are typically deployed over much larger lateral distances, for example, from one hundred meters to a kilometer or more, and may extend for several kilometers behind the tow vessel.

Lateral spacing can be achieved by deploying a paravane or diverter apparatus on a dedicated tow rope arrangement using a spreader or series of individual tether lines to provide the desired spacing between adjacent cables. Positioning devices can also be provided along each streamer cable, in order to maintain depth and/or lateral offset along the cable length.

Generally, paravanes, doors, diverters and similar steering solutions tend to increase drag forces, and require substantial deck area during storage, deployment, and retrieval. Steering response can also be limited, not only by the diverter operating system, but also due to the complex nature or the additional tow ropes, tag lines, and other required elements. As a result, there remains a need for position control systems to provide improved dynamic control with less drag without being subject to other limitations of the existing prior art.

The information included in this Background section of the specification, including any references cited herein and any description or discussion thereof, is included for technical reference purposes only and is not to be regarded subject matter by which the scope of the invention as defined in the claims is to be bound.

SUMMARY

This application relates to seismic prospecting and to foil systems for source and receiver arrangements for gathering seismic data and methods for controlling the same. For example, the foil systems may be applied to an apparatus for positioning and maintaining spacing between seismic sources, sub-arrays, and/or streamer cables during a seismic survey, e.g., in a source array towed behind a vessel, or in a towed marine seismic array. The application also relates to foil systems for ocean bottom cable deployment, e.g., dual (or multiple) ocean bottom cable deployment utilizing a sub-sea sled or towed object with a dynamically control foil system to provide lateral displacement, up/down lift, or both.

In one implementation, an apparatus includes a positive buoyancy device, a pair of control cables, a plurality of foil sections, and an actuator. The pair of control cables may be attached to the buoyancy device and extend downward from the buoyancy device to a submerged end. The plurality of foil sections may be disposed along the control cables between the buoyancy device and the submerged end. The actuator may be configured to adjust attack angles of the foil sections by changing a tension in one or both of the control cables.

In another implementation, a system includes a surface or subsurface buoyancy device, a forward control cable, an aft control cable, an actuator, and a plurality of foil sections. The forward control cable may be coupled to and extend beneath the buoyancy device. The aft control cable may also be coupled to and extend beneath the buoyancy device. The actuator may be mounted to the buoyancy device. The actuator may be configured to adjust tension in the aft control cable with respect to the forward control cable. The plurality of foil sections may be disposed along the forward and aft control cables. The foil sections may be configured to generate lift based on attack angles thereof. The attack angles of the foil sections may vary as a function of the tension.

In yet another implementation, a seismic array includes a plurality of towed seismic sources and a plurality of dynamically controlled steering systems attached to each of the seismic sources, respectively. Each steering system may include a positive buoyancy device, a pair of control cables, a plurality of foil sections, and an actuator. The pair of control cables may be attached to the buoyancy device and extend downward from the buoyancy device to a submerged end. The plurality of foil sections may be disposed along the control cables between the buoyancy device and the submerged end. The actuator may be configured to adjust attack angles of the foil sections by changing a tension in one or both of the control cables.

In a further implementation, a method of steering a seismic array is disclosed. The seismic array may include a plurality of towed seismic devices and a plurality of dynamically controlled steering systems attached to each of the seismic sources, respectively. Each steering system may include a positive buoyancy device, a forward control cable, an aft control cable, a plurality of foil sections, an actuator, and a foil controller. The forward control cable may be coupled to and extend beneath the buoyancy device. The aft control cable may also be coupled to and extend beneath the buoyancy device. The plurality of foil sections may be disposed along the forward and aft control cables. The actuator may be mounted to the buoyancy device. The actuator may be configured to adjust attack angles of the foil sections by changing a tension in one or both of the control cables. The foil controller may be configured to direct the actuator to adjust the tension in either or both of the control cables and thereby regulate lift generated by the plurality of foil sections. The method may include transmitting data from the foil controller to one or more of the steering systems in order to instantiate a mode in the corresponding actuator. The actuator may further be caused to adjust tension in the aft control cable with respect to the forward control cable to generate lift for steering the corresponding buoyancy device and attached seismic source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

FIGS. 10A-10D are front, side, isometric, and bottom views of an actuator for the cable adjustment mechanism of FIGS. 9A-9C.

DETAILED DESCRIPTION

In the following disclosure, reference is made to a number of exemplary embodiments or specific implementations of the claimed invention. However, it should be understood that the claims are not limited to specific described embodiments. Instead, any combination of the following features and elements, whether related to different embodiments or not, is contemplated to implement and practice the claimed invention. Furthermore, the various embodiments may provide numerous advantages over the prior art. However, although such embodiments may achieve advantages over other possible solutions and over the prior art, whether or not a particular advantage is achieved by a given embodiment is not limiting of the claims. Thus, the following aspects, features, embodiments, and advantages are merely illustrative and are not considered elements or limitations of the appended claims except where explicitly recited in the claims. Likewise, reference to "the invention" shall not be construed as a generalization of any inventive subject matter disclosed herein, and shall not be considered to be an element or limitation of the appended claims except where explicitly recited in the claims.

Figure 1:
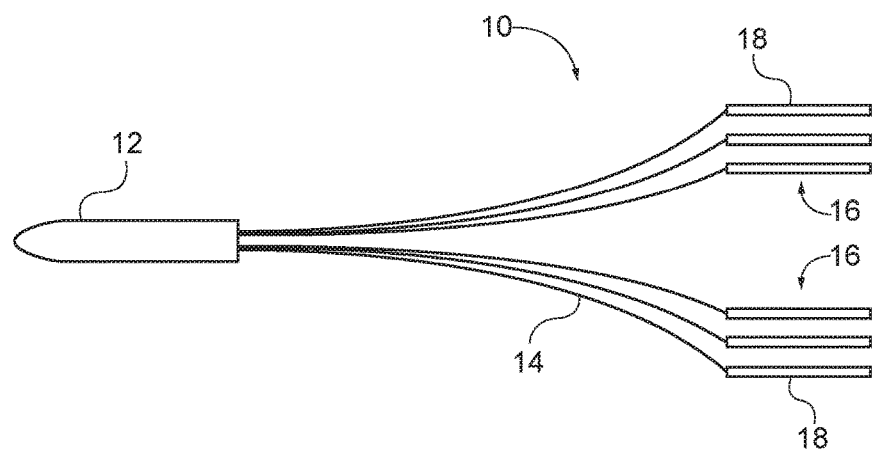
FIG. 1 is a schematic illustration of a towed source array utilizing a dynamically controlled foil system for steering.

FIG. 1 is a schematic illustration of a source array 10 towed by a seismic survey craft or other vessel 12. As shown in FIG. 1, tow lines or cables 14 are coupled to vessel 12 at one end and attached to a sub-array or string 16 of seismic sources at the other. For example, each tow cable 14 can be coupled to a series of air guns or other sources suspended from a head float, buoy, or other flotation apparatus 18.

The source array 10 is directed along a navigational course or sail line by tow vessel 12. Within the source array 10, the relative positions of the individual sources (or sets of sources) can be controlled by providing a dynamically steerable foil system for each floatation apparatus 18, or for groupings of floatation apparatus 18, as described herein.

Figure 2:
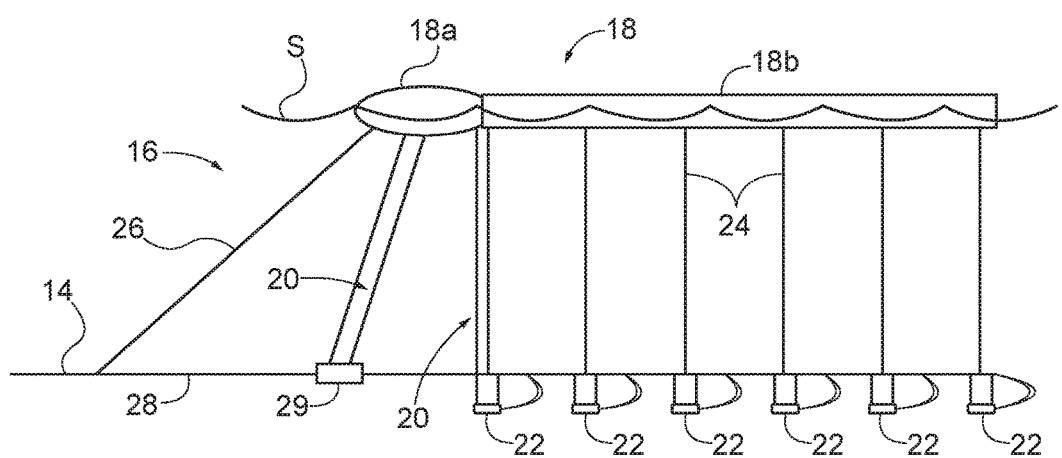
FIG. 2 is a schematic side view of the source array illustrating representative configurations of the foil system.

FIG. 2 is a side view of source array 10 illustrating representative configurations for dynamically controlled foil system 20. In this particular example, a sub-array or string 16 of individual air guns or other seismic sources 22 is suspended from the floatation apparatus 18 via suspension ropes 24, which determine the depth of sources 22 below surface S. Suspension ropes 24 are coupled to selected portions of float 18, e.g., between head float section 18a and the trailing end of sausage float section 18b.

Float 18 is towed along surface S via a tow cable 14, which is coupled to the head float section 18a via a tow leader 26. The tow cable 14 typically comprises an umbilical 28 with data and power connections for seismic sources 22 and is connected to the foil system 20 at a cable connector 29. In air gun applications, the umbilical 28 may include a pneumatic hose or conduit configured to provide pressurized air to the seismic sources 22 in order to generate acoustic shock waves when fired in response to direction by a control system. The shock waves (or other seismic signals) propagate from the seismic sources 22 through the water or other medium, penetrating the ocean floor and reflecting back from subsurface features. The reflected signals are recorded by seismic sensors (e.g., hydrophones or geophones in a streamer cable or ocean-bottom array) and processed to generate geophysical image data representing the subsurface structures.

As shown in FIG. 2, the dynamically controlled foil system 20 can be coupled between the floatation apparatus 18 and a submerged portion of the tow cable 14, e.g., at the cable connector 29 between the head float 18a and the umbilical portion 28 of the tow cable 14, aft of a tow leader 26 and forward of the seismic sources 22. Alternatively, the submerged end of the foil system 20 can be coupled to one of the seismic sources 22 (e.g., to the first gun plate in the string).

In these configurations, the foil system 20 is configured to steer the head float 18a by generating hydrodynamic lift forces, which are controlled to achieve the desired lateral positioning of the seismic sources 22 within the source array 16 and with respect to the tow vessel 12. Alternatively, one or more foil systems 20 can be coupled to the sausage float section 18b and positioned along (or in place of) any of a number of suspension ropes or cables 24, for example, in a forward position at the lead seismic source 22, in an intermediate position between individual seismic sources 22, or in an aft position at (or trailing behind) the last seismic source 22.

Figure 3A:
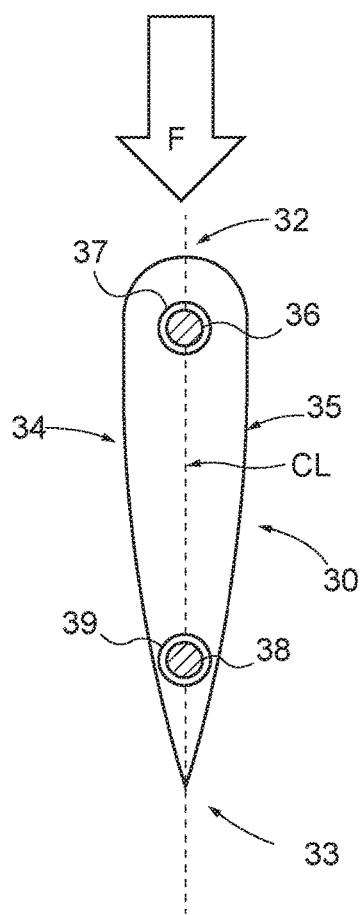
FIG. 3A is a cross-section view of a foil segment for the foil system of FIGS. 1 and 2.

FIG. 3A is a cross-section view of a foil segment or foil section 30 for the dynamically controlled foil system 20, e.g., as shown in FIGS. 1 and 2, above. As illustrated in FIG. 3A, the foil section 30 extends from a leading edge 32 to a trailing edge 33, defining a chord or chord line (CL) between a first surface 34 (e.g., a pressure surface) and a second surface 35 (e.g., a suction surface).

A forward rope or control cable 36 extends through a front conduit 37 in the front portion of the each foil section 30 toward the leading edge 32. An aft rope or control cable 38 extends through a rear conduit 39 in the back portion of the foil section 30 toward the trailing edge 33. The front and rear conduits 37, 39 may extend in parallel with each other and with the leading edge 32 of the foil sections 30 and reside in a common plane with each other, the leading edge 32, and a longitudinal bisector of the trailing edge 33 of each of the foil sections 30 The control cables 36, 38 are arranged generally in parallel as they extend through the front and rear conduits 37, 39 in the foil sections 30. In embodiments in which the widths of the plurality of foil sections 30 between the leading edge 32 and the trailing edge 33 are the same or substantially equivalent, the control cables 36, 38 may be positioned equidistantly apart along their length.

As shown in FIG. 3A, the front and rear conduits 37, 39 are generally centered along the chord line (CL), proximate to the leading edge 32 and the trailing edge 33, respectively. This arrangement increases or substantially maximizes the longitudinal separation between the forward and aft cables 36, 38, but is merely representative. More generally, the longitudinal positions of the front and rear conduits 37, 39 (and the forward and aft cables 36, 38) vary between the leading edge 32 and the trailing edge 33, as do the corresponding lateral positions with respect to the chord line (CL) between the first and second opposing foil surfaces 34, 35.

The front and rear conduits 37, 39 can thus be provided for stringing the forward and aft cables 36, 38 in various positions between any floatation apparatus 18 and a submerged end, cable, or component, e.g., as shown above in FIG. 2. Rotation of the foil section 30 about the forward cable 36 is controlled by adjusting the relative length or tension in the forward and aft cables 36 38 in order to steer foil section 30.

The dynamically controlled foil system 20 can thus be provided as a steerable fairing, vane, or hydrofoil apparatus utilizing one or more foil sections 30, which are controlled via the forward and aft cables 36, 38 to generate desired hydrodynamic lift or steering forces. Alternatively, the foil system 20 can be described as a dynamically steerable fairing string, utilizing either a plurality of individual foil sections 30, or a single continuous flexible foil 30, with segments 30 defined along the spanwise length.

Suitable materials for the foil section 30 include composites or polyurethane and other plastics or durable polymers. In one embodiment, for example, a continuous, flexible-span polymer or composite foil 30 can be threaded between forward and aft cables 36, 38 to form a substantially unitary fairing or fairing string. Alternatively, a plurality of discrete rigid or flexible foil sections or vanes 30 can be threaded onto the forward and aft cables 36, 38, in either a spaced or abutting configuration and with or without interconnecting linkages.

In these embodiments, the foil sections 30 may be formed of either flexible or rigid materials, and each foil section 30 may have substantially the same span, or the spans can be individually selected. Similarly, each foil section 30 may have substantially the same foil geometry, or the foil geometries may vary as a function of depth or position (e.g., between the surface float and submerged cable attachments). The foil sections 30 can also be provided in either symmetric or asymmetric form, for example, using one or more NACA series, Gottingen, or Eppler designated foil geometries.

Figure 3B:
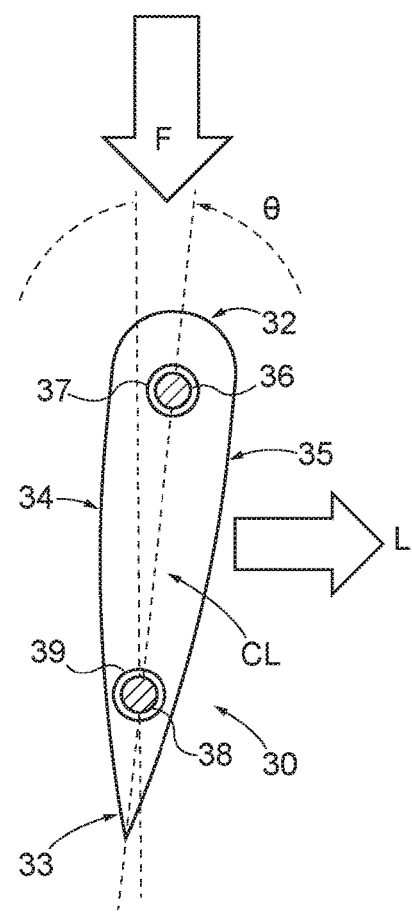
FIG. 3B is an alternate view of the foil segment illustrating an angle of attack.

FIG. 3B is an alternate view of foil section or segment 30, illustrating an angle of attack θ as defined with respect to the flow direction (F). The lift or steering forces generated by the foil section 30 are designated by arrow (L).

In general, the lift (L) depends both upon foil geometry and the angle of attack θ Adjustments in the relative length of or tension in the forward and aft cables 36, 38 can thus be used to control the steering forces on each foil section 30 by changing the angle of attack. Note, however, that for asymmetric foil sections 30, the lift (L) is typically generated in a positive sense (e.g., in the direction from the pressure foil surface 34 toward the suction foil surface 35), even for zero or somewhat negative attack angles θ. For symmetric foil sections 30, on the other hand, the lift (L) can change sign with the angle of attack θ.

Asymmetric foil geometries thus provide a more stable configuration, in which the direction of the lift (L) is substantially determined by the orientation of the pressure and suction foil surfaces 34, 35, and steering is accomplished by changing the angle of attack to increase or decrease the magnitude of the corresponding steering forces on the foil sections 30. One such asymmetrical foil cross section is defined by the NACA 2318 foil, but other suitable geometries may be utilized, including, but not limited to, other NACA, Gottingen, and Eppler foil geometries. Alternatively, the forward and aft cables 36, 38 may be offset by providing off-chord conduits 37 and 39, laterally displaced from chord line (CL) as described above.

Figure 4:
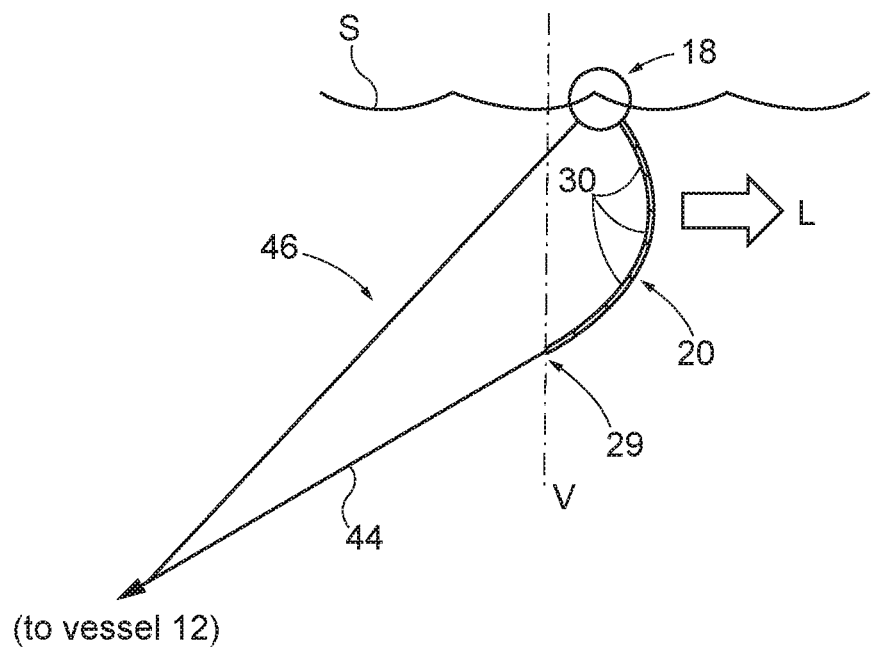
FIG. 4 is a schematic illustration of the foil system illustrating lift effects.
Figure 5:
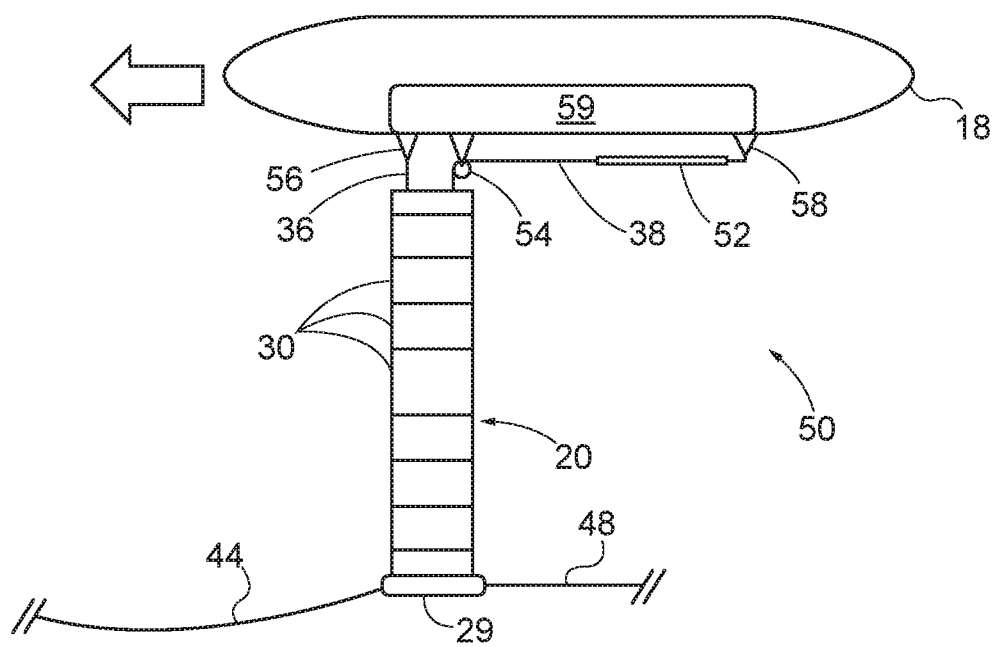
FIG. 5 is a schematic illustration of a cable adjustment mechanism for the foil system.

FIG. 4 is a schematic illustration of the dynamically controlled foil system 20, illustrating lift effects. Each foil system 20 may be composed of a plurality of foil sections 30 aligned with and stacked on top of each other as shown in FIGS. 4 and 5 such that the leading edges 32 and trailing edges 33 are all aligned in substantially the same direction, respectively. The foil sections 30 are held in alignment with each other by the forward and aft cables 36, 38 passing through the front and rear conduits 37, 39 in each foil section 30. As lift (L) is generated, individual foil sections 30 will typically take on a curved or sinusoidal profile along the span of the foil system 20, between the floatation apparatus 18 on the surface (S) and the submerged end or at the connection between the cable connector 29 and a tow cable 14, a seismic source 22, or other submerged cable 44. Even when the foil system 20 curves under tension, the leading and trailing edges 32, 33 of the foil sections 30 maintain a common directional orientation, respectively.

Note that the amplitude of the effect is not to scale, and is exaggerated in FIG. 4 to illustrate the relative displacement of the foil sections 30 with respect to vertical (V), as defined generally perpendicular to the surface (S). Generally, a twist will also develop along the span, so that the angle of attack may be relatively smaller for the top and bottom foil sections 30 near the floatation apparatus 18 and the cable connector 29 to the submerged cable 44, respectively, and relatively larger for the foil sections 30 in the mid-span region. Thus, the foil sections 30 in the mid-span region may tend to generate more lift than the top and bottom sections, resulting in the "billowing" or sinusoidal effect of FIG. 4.

Alternatively, the foil geometry of individual foil sections 30 may be selected to reduce lift in the mid-span region between the floatation apparatus 18 and the submerged cable 44, as compared to the top and bottom foil sections 30. For example, the foil sections 30 may have different foil geometries selected to generate more uniform lift across the span or to increase or reduce span-wise lift effects.

FIG. 5 is a schematic illustration of a representative the adjustment mechanism 50 for the dynamic foil system 20. As shown in FIG. 5, a turnbuckle 52 and a pulley 54, ratchet, winch, or similar cable guide and feed mechanism may be mounted to the floatation apparatus 18, e.g., between the top end of the aft control cable 38 and an aft anchor point 58 on the back or rear section of the floatation apparatus 18 (in the trailing edge direction of the foil sections 30). The forward cable 36 is mounted to a forward anchor 56 attached to the front section of the floatation apparatus 18 (in the leading edge direction of the foil sections 30).

The adjustment mechanism 50 can be configured for adjusting either the forward cable 36 or the aft cable 38; both embodiments are encompassed. Another option is to use an adjustment mechanism 50 that provides differential adjustments to both forward and aft cabled 36, 38; e.g., by shortening one cable while lengthening the other at the same time. In some designs a single control cable may be used, extending from the forward cable anchor 56 down along a forward cable section 36, then passing through a cable return or wrapping or inflecting around a cable connector 29 attached to a submerged cable 44, and back up along an aft cable section 38 to the aft anchor 58 through the pulley 54. Alternatively, separate forward and aft control cables 36, 38 may be provided, e.g., individually attached at the submerged cable connector 29. The submerged cable 44 can be provided either as a tow line for a streamer cable 48 or as an umbilical for a source gun array.

A control device 59 for the adjustment mechanism 50 may be located at either the top or bottom end of the foil system 20, for example, inside the floatation apparatus 18, as shown in FIG. 5. Suitable control devices 59 include processor, memory, and software components configured to direct the adjustment mechanism 50 to selectively vary the length and/or tension in the forward and aft cables 36, 38, in order to regulate the lift and steering forces generated by the foil system 20 by changing the angle of attack along individual foil sections 30. For example, the control device 59 may be configured to control an electric motor or similar drive in order to actuate the adjustment mechanism 50, providing for automated steering by adjustment of the relative length and tension in the forward and aft control cables 36, 38. Other control options include, but are not limited to, hydraulic and pneumatically controlled ram or piston mechanisms, electric winch drives, and motor-driven rack and pinion arrangements.

Figure 6:
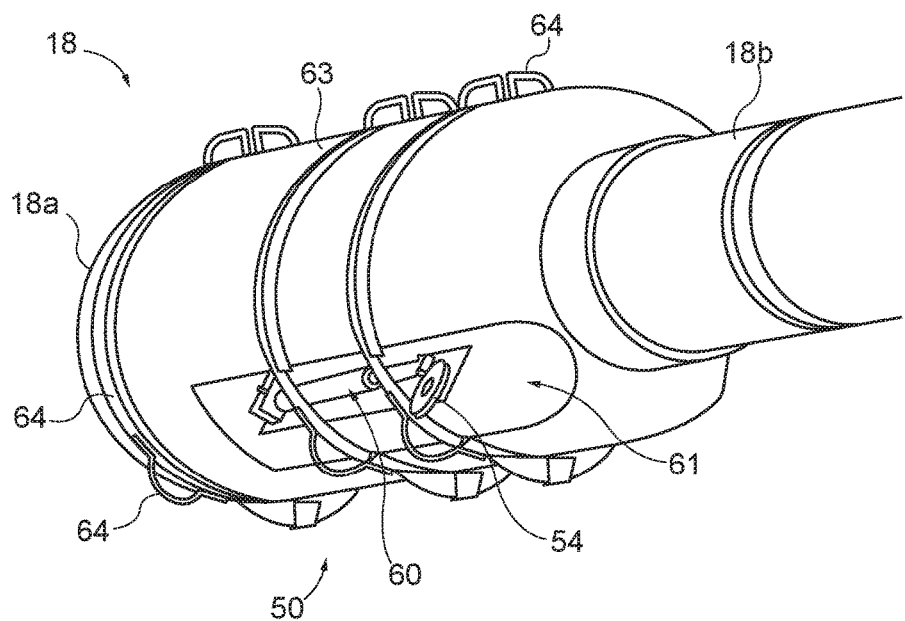
FIG. 6 is an isometric view of the cable adjustment mechanism in an external, horizontal mount configuration.

FIG. 6 is an isometric view of the adjustment mechanism 50 in an external, horizontal mount configuration on a head float 18a. In this example, the adjustment mechanism 50 includes a linear actuator 60 and the pulley 54 mounted horizontally in a concave recess 61, which is defined on the exterior surface of the head float 18a.

The recess 61 extends longitudinally along the bottom (or ventral) portion of the head float 18a, from just aft of the forward end, opposite the sausage section 18b, through to the aft end of the head float 18a, proximate to the sausage section 18b. A number of structural bands 63 can be provided to encircle the head float 18a with a number of brackets 64 for handling during deployment and retrieval.

Figure 7:
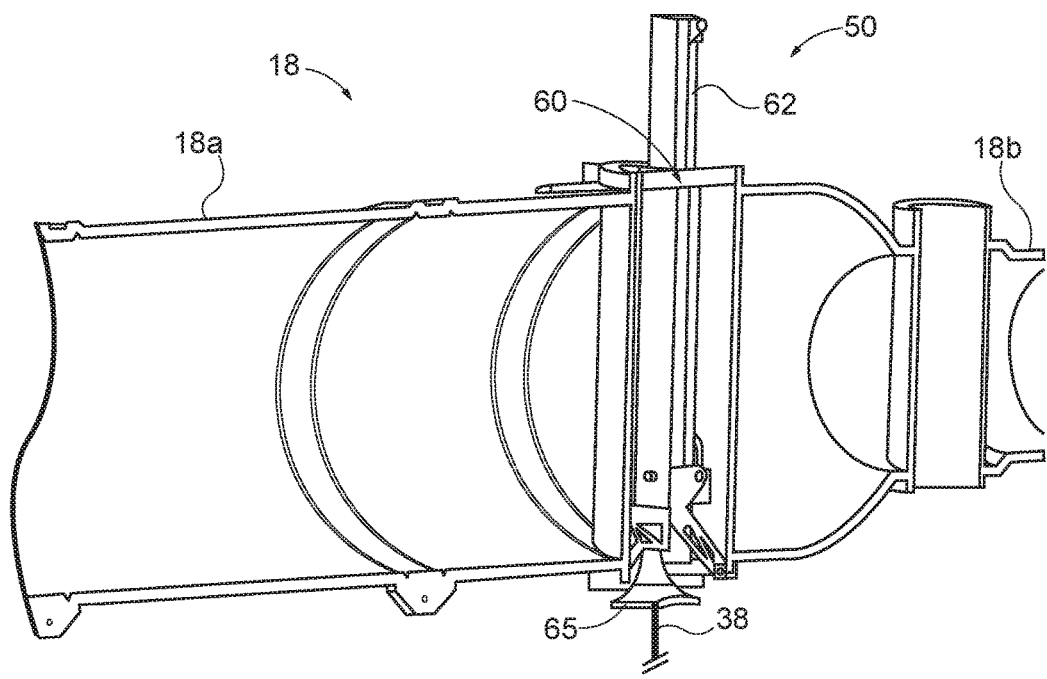
FIG. 7 is a cutaway view of the cable adjustment mechanism in an internal, vertical mount configuration.

FIG. 7 is a cutaway, isometric view of the head float 18a, showing the adjustment mechanism 50 in an internal, vertical mount configuration. In this example, the linear actuator 60 is mounted inside the aft end of the head float 18a and operates to drive a ram 62 vertically up and down. The ram 62 is coupled to the aft control cable 38, which extends down through a funnel-shaped coupling 65. The coupling 65 provides a bend radius for the aft control cable 38.

Generally, the tension in the aft control cable 38 can be increased to "power up" the foil system, increasing the angle of attack and increasing the corresponding lift. Conversely, the tension in the aft cable 38 can be decreased to "depower" the system, decreasing the angle of attack and reducing the lift. In alternate embodiments the rigging can be reversed, for example by providing aft cable 38 with a fixed tension and increasing or decreasing the tension in the forward cable 36 or by implementing differential rope length adjustments.

Figure 8:
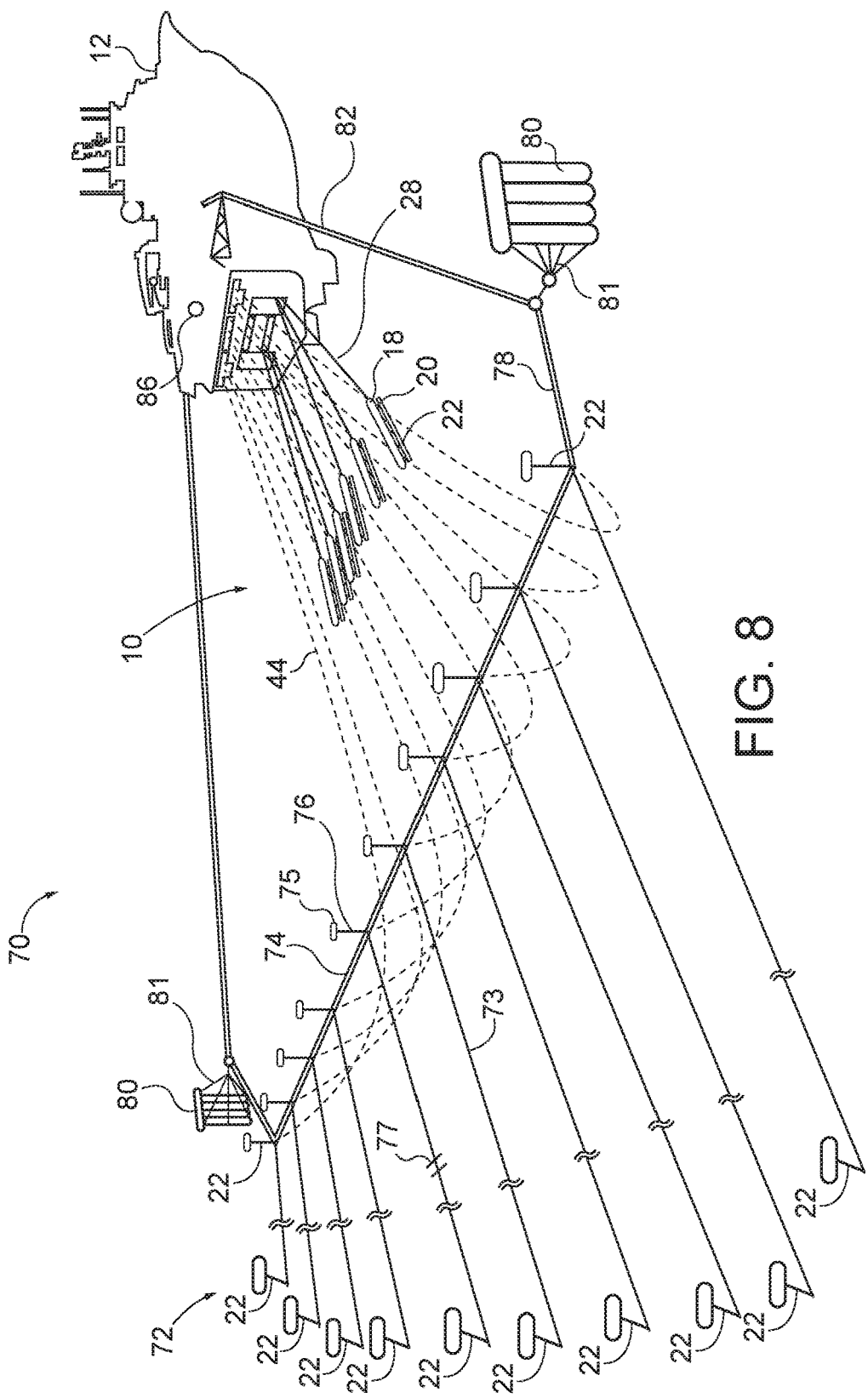
FIG. 8 is a schematic view of a representative towed seismic array utilizing one or more dynamically controlled foil systems for steering source and/or streamer components.

FIG. 8 is a schematic view of a representative towed seismic array 70 utilizing one or more dynamically controlled foil systems 22 for steering source and/or streamer components. As shown in FIG. 8, the seismic array 70 includes a source array 10 and a streamer array 72. Source array 10 includes a number of head/sausage type floats 18 from which individual seismic sources 22 are suspended with umbilical cables 28 for power, data, and pneumatic connections to the survey vessel 12. The streamer array 72 includes a plurality of individual streamer cables 73 with seismic receivers distributed along each cable length to observe the reflected signals from the seismic sources 22.

The streamers 73 are coupled to tow lines or other submerged cables 44 along a spreader or separation rope 74, which is suspended at streamer depth below corresponding head buoys 75 using tag lines or depth ropes 76. The streamers 73 may extend many kilometers from the head buoys 75 toward a corresponding number of tail buoys 77 at the aft end (not to scale).

As shown in FIG. 8, the separation rope 74 is laterally extended by attachment to spur lines 78, which are coupled to paravanes or diverters 80 via deflector straps 81. Wide tow ropes 82 run between paravanes or diverters 80 and the tow vessel 12. The dynamically controllable foil system 20 may be provided on or in place of one or more streamer tag lines or depth ropes 76, extending from the head buoys 75 down to the forward end of the streamer cables 73. The steerable foil systems 20 may also be provided between the tail buoys 77 and the aft ends of the streamer cables 73 and in intermediate streamer locations.

Seismic survey vessel 12 is provided with a navigational system 86 including one or more foil steering modules configured to communicate with the dynamically steerable foil systems 20 deployed variously in the source array 10 and the streamer array 72, and/or among the other components of the towed seismic array 70. The foil systems 20 can also be utilized, in addition to source steering, to independently steer and laterally position streamers 73 with or without a discrete spreader or separation rope 74.

The steerable foil systems 20 can also be provided in lieu of diverters or paravanes 80, for example in the end streamer positions as shown in FIG. 8, without the need for a separate spur line 78 and wide tow rope 82. Alternatively, the foil systems 20 can be used within or provided in place of one or more diverters or paravanes 80 using a similar spur cable configuration.

More generally, the foil system 20 can be utilized for steering a wide range of submerged cable and float arrangements, suitable not only to seismic source and streamer steering but also for ocean-bottom cable and node deployment, side scan surveys, and sonar applications. The dynamically steerable foil system 20 may also be adapted to more generalized (non-seismic) uses including generic paravane, diverter and hydrofoil systems. Use with paravane/diverter cable or P-cable and ocean bottom cables are additional options.

Figure 9A:
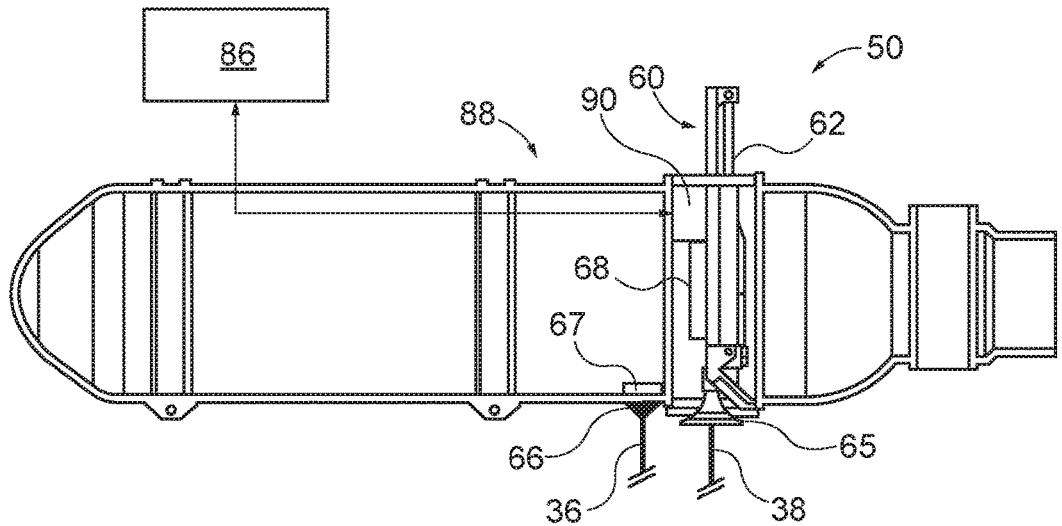
FIG. 9A is cross-section view of a representative buoyancy device with an internal, vertically oriented cable adjustment mechanism.
Figure 9B:
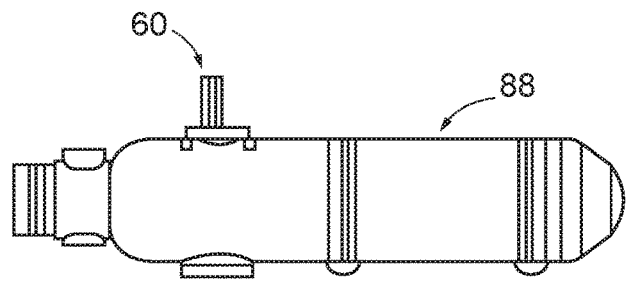
FIGS. 9B and 9C are side and top views of the buoyancy device in FIG. 9A, respectively, showing the cable adjustment mechanism.
Figure 9C:
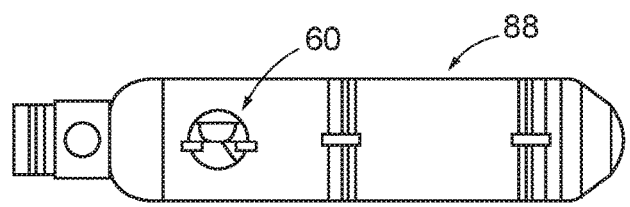

FIG. 9A is a cross-section view of a representative float or buoyancy device 88 with an internal, vertically-oriented cable adjustment mechanism 50. FIGS. 9B and 9C are side and top views of float or buoyancy device 88, respectively.

The buoyancy device 88 can take the form of a surface or subsurface float, positive buoyancy device, or other arrangement that provides some form of upper and/or lower attachment point to which the stacked foil system 20 can be coupled and pull against. Suitable examples include, but are not limited to, a head float, a sausage buoy, a head buoy, a tail float, a tail buoy, or similar surface or subsurface flotation apparatus, configured either for seismic source or streamer steering, or for a generic dynamically steerable hydrofoil or vane application, as described above. In additional embodiments, the actuator system may be utilized with a horizontal foil string, e.g., to provide upward or downward lift. Similarly, dynamically controlled foils can be provided in a neutrally buoyant paravane system configured to tow a three-dimensional streamer spread under ice. The concept can also be used for a neutrally buoyant (e.g., under ice) source float device, e.g., for use in the Arctic or other cold water environment.

As shown in FIG. 9A, the adjustment mechanism 50 includes the linear actuator 60 with the vertically-actuated ram 62 coupled to the aft control cable 38. The forward control cable 36 is attached to the floatation apparatus 18 via the forward mount 66, for example, using a load cell or strain gauge 67 configured to determine the tension in the forward control cable 36. An additional sensor system 68 can be configured to determine the vertical position of the ram 62 and the corresponding length and tension in the aft control cable 38. Suitable components for the sensor system 68 include, but are not limited to, strain gauges, load cells, reed switches, and linear and optical encoder components. Rotary sensors or encoders can also be utilized, for example, to determine the position of the ram 62 by counting the number of revolutions of a screw shaft or other rotary drive component of the linear actuator 60.

A foil control system 90 can be mounted within the buoyancy device 88 and is provided with suitable processor and memory components in data communication with the linear actuator 60 and the foil steering module (or modules) in the navigational system 86. The foil control system 90 coordinates with the controller device 59 and the navigational system 86 to provide steering capability in a range of different operating modes as described below.

FIGS. 10A-10D are front, side, isometric and bottom views of the linear actuator 60 for a cable adjustment mechanism, e.g., the adjustment mechanism 50 as shown in FIGS. 5-7 and 9 above. As shown in FIGS. 10A-10D, the linear actuator 60 may be mounted between a top bracket 92 and a bottom bracket 93, which are adapted for mounting the linear actuator 60 inside a head float, buoy, or other positive buoyancy device 88 as described herein for use in adjusting control cable length and tension for a dynamically steerable foil or vane apparatus.

The actuator system 60 may include one or more of an actuator control 94, actuator electronics (or motor controller) 95, and an accumulator 96. Alternatively, one or more of these components can be integrated into the foil control system 90 as described above. In additional embodiments, functions of the actuator and motor control can be incorporated into a foil steering module or into the more generalized navigational and control system.

Operational Modes

Various operational modes can be programmed into the control software to provide for active navigation of source sub-arrays and streamers using dynamically controlled foil systems, as described herein. The software components can be included in both the local foil control systems, which are provided in the float device or with the actuator system, and in the corresponding foil steering modules, which are utilized with the navigational system on board the towing vessel. Alternatively, one or more of the software components can be configured for operation over a network, e.g., with an electrical, radio, or acoustic communication and command structure.

More specifically, the software is configured to control a linear actuator mounted on each source sub-array head float (or other float device). In order to change the lift of a steerable foil stack attached between the head float and the first gun plate or other submerged cable position. The linear actuator changes the relative length or tension in the aft control cable, as compared to the forward control cable, changing the angle of attack in order to provide a desired lift or steering force, as described above.

Figure 11A:
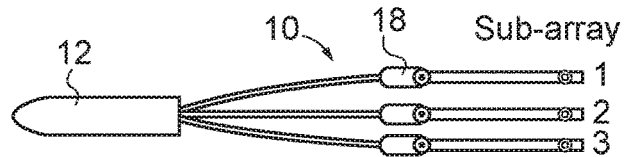
FIGS. 11A-11D illustrate representative source configurations for various operational modes of the dynamically steerable foil system.
Figure 11B:
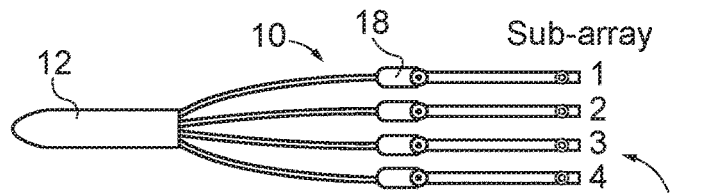
Figure 11C:
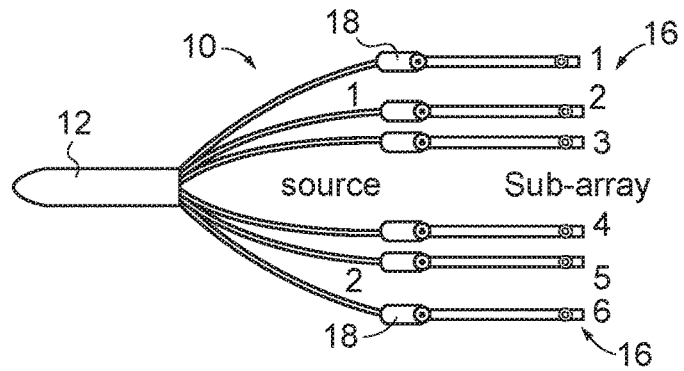
Figure 11D:
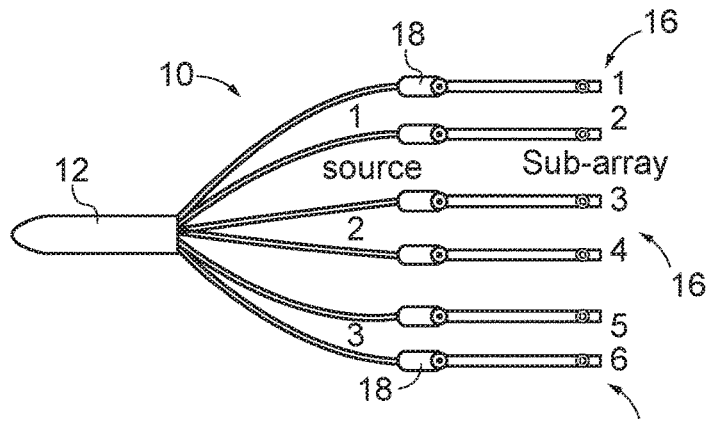

FIGS. 11A-11D illustrate representative source configurations for the various operational modes of the dynamically steerable foil system. These four configurations can be towed behind a source vessel, with FIGS. 11A and 11B representing single source configurations, and FIGS. 11C and 11D representing multi-source configurations.

FIGS. 11A-11D can be referred to for defining source and sub-array string numbers. Sub-array string numbers increment sequentially from starboard to port as well as all source numbers (combinations of sub-array strings that are fired coincidentally). Alternatively, the sub-arrays numbers can refer to streamer cable positions, rather than source positions, or to paravane or diverter indexes.

Control Software

In operation, a navigation data feed will be supplied by the foil steering modules of the navigational system to the local foil control system, so that actuator commands can be determined based on the sub-array positions. The control software may include proportional-integral-derivative (PID) logic in order to maintain proper separations. In alternative designs for the control software, the foil control system and/or foil steering modules may replace one or more of the actuator control systems, and the actuator control software may be integrated into the foil control system, the foil steering modules, or the navigational system itself. For example, the respective control code may be included within either a source or streamer steering module. Both "future track" and 4D steering capabilities are contemplated, but neither may necessarily be required in any particular design.

Inputs to the Control Software

The vessel navigation software can also provide positions of each sub-array or string in real time. Each sub-array can be configured with at least one global positioning system pod (e.g., dGPS or rGPS) and, in some cases, two. It is understood that at least one gun or source pod should be functional for communication of positional information with the control software. Acoustic, radar, or laser positioning systems could be used as well.

Two data messages are defined, one from the navigation system (or foil steering modules) to the foil controller with positional information, and one from the foil controller to the navigation system (or foil steering modules) containing foil system status and alarms. These navigation data messages can utilize an existing protocol to pass the navigation data, for example, in cooperation with a client-provided or dedicated steering control system. The message formats described here can be designed to be similar in content to existing navigational messages, but provide for dynamical steering of the foil systems, as described herein.

FROM the NAVIGATION SYSTEM to the FOIL CONTROLLER: Data can be provided from the navigational system to the foil control computer at regular intervals, e.g., once a second. The data output can be available at all times, independent of the vessel's operating mode (e.g., online, offline, etc.). The navigational system makes in-water positioning information available to the foil control computer in real time, e.g., information that is no more than 2 seconds old, or within another time window. A command message can be transferred, and each message can be time tagged with UTC time.

MESSAGE from NAVIGATION SYSTEM to FOIL CONTROL: These messages can be split into three sections: 1) Main Body; 2) Vessel Data; and 3) Source Data. Consistent source numbering can be used for different source and streamer array components (e.g., 1 to N, Starboard to Port). Consistent sub-array string numbering can also be used (1 to N, Starboard to Port). The SMA's are provided to alert the controller to any problems in positioning.

STATUS and ALARMS from FOIL CONTROLLER to NAV SYSTEM: Suitable Main Message fields related to status and alarms sent from the foil controller to the navigational system (or foil steering modules) include, but are not limited to: Header, Message Time (Time of Message; UTC), Source String ID (1 . . . N; 1=Starboard; N=Port), Actuator ID (Actuator S/N), Controller Status (Standby, Active, Fault), Rope Tension (e.g., 0-2000 kg), Error message (If fault, fault code; otherwise zero), and EOM (End of Message; e.g. <CR> <LF>). These fields can be repeated based on the number of source strings; e.g., once per source string.

Operational Modes

The actuator software functions in one or more operational modes including, but not limited to, any of operational modes 1-6, as enumerated below.

1. Manual Mode—Any actuator may be manually moved to the limits of the actuator's capabilities. The minimum and maximum detents should be known so as to not cause any mechanical failure to the ram. This mode would normally be used during deployment and retrieval to "stack" sub-arrays to one side allowing any sub-array to be worked on. A minimal sub-array separation parameter should be set in the software so that the operator cannot move two sub-arrays so close that they tangle.

2. Calibration Mode—Any two sub-arrays may be chosen (ideally #2 and #5 in multi-source mode) to provide a fixed separation while equalizing the tension readings on their respective load cells. This mode is to allow the sub-arrays to meet their required separation, but equalize the lift so as to maintain reserve lift in both the port and starboard directions. During this calibration, sub-arrays 1 and 6 should be flown at their maximum separation. If a collision between any sub-arrays is imminent (separation less than the minimal separation parameter from mode #1), the calibration function should be stopped and an operator warning provided.

3. Online Operation Mode—One sub-array may be chosen to be the "master" sub-array from which all others will maintain a fixed separation distance based on the nominal geometry. If a collision condition is detected, then all sub-arrays should reduce their lift so as to maintain a safe separation. A PID control may be used to make automatic corrections to compensate for variable currents and tow speeds.

4. Offline Operation Mode—This mode may be chosen to be one of two conditions: either maintain the Online Operation Mode through a turn or go to an alternate configuration once the navigation system flags the Offline condition. The alternate condition may be a fan mode wherein all sub-arrays attempt to maintain maximum separation between themselves.

5. Run-in Operation Mode—During this condition all sub-arrays may transition from an Offline alternate configuration to the Online Operation Mode. If the sub-arrays are already in the Online Operation Mode then nothing needs to be changed.

6. Steer for Effect Mode—This mode allows each source to independently steer either port or starboard to meet a desired fold-of-coverage effect. During the steering, the sub-array separation within each source is to maintain the nominal separation distance.

Failsafe Modes

The actuator software also functions in either of two failsafe modes, as enumerated below.

1. If communications between the vessel and any actuator or foil controller is lost, the last known actuator position should be maintained and a warning provided to the operator. In this case, the failed sub-array should be switched to be the "master" sub-array and all others should be controlled to maintain separation from the failed sub-array.

2. If tension on a tow line is measured as being below some minimum threshold value indicating a separated rope, the mode should automatically be switched to Offline-Fan mode to mitigate potential entanglement and a warning signal generated.

Additional Embodiments

Figure 12:
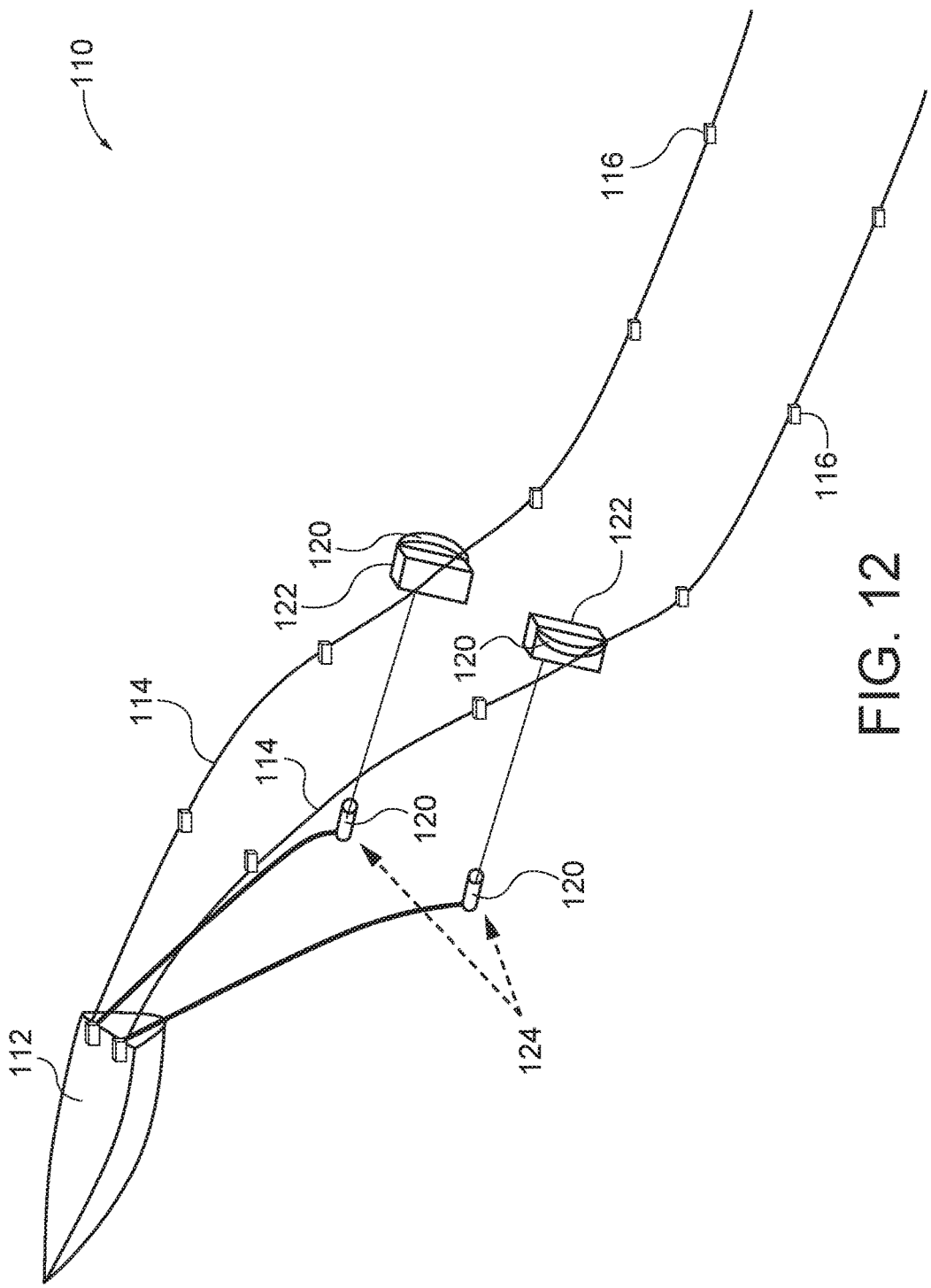
FIG. 12 is a schematic illustration of the dynamically controlled foil system in a subsurface cable deployment application.

FIG. 12 is a schematic illustration of dynamically controlled foil system 120 in a subsurface cable deployment application or apparatus 110, for example, utilizing dynamically controlled foil system 20 as described above. As shown in FIG. 12, a subsea apparatus 110 includes node connecting ropes or cables 114 for connecting nodes 116. The cables 114 can be towed behind or deployed from vessel 112.

One or more dynamically controlled foil systems 120 may be utilized in various locations within apparatus 110, for example in a steering guide frame 122 or similar steering device configured to provide lateral force. Alternatively, one or more dynamically controlled foil systems 120 can be utilized in a depressor system 124, e.g., in a horizontal configuration configured to provide a downward force or up/down lift. In some embodiments, foil systems 120 are utilized in both steering device(s) 122 and depressor system(s) 124.

Figure 13:
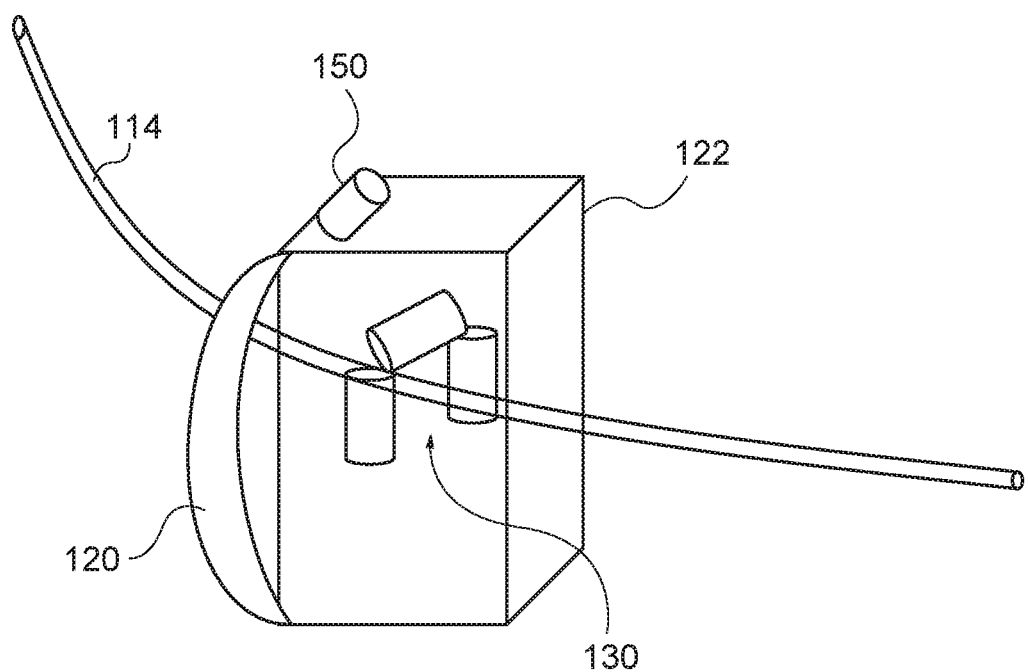
FIG. 13 is a schematic illustration of a subsea guide frame for a subsurface cable apparatus.

FIG. 13 is a schematic illustration of a subsea guide frame 122 or similar steering device for a subsea cable apparatus 110. As shown in FIG. 13, the guide frame 122 is coupled to the node connecting cable 114. The guide frame 122 includes a dynamically controllable foil system 120, instrumentation 130, and an actuator 150 (e.g., the same as or similar to the actuator mechanism 50, as described above). The instrumentation 130 may include additional components including, but not limited to, USBL (ultra-short baseline) or other acoustics systems, one or more motion sensors, a fathometer, acoustic Doppler current profiler (ADCP) systems, forward looking sonar, and power and communications equipment configured for communication with a foil control module or surface navigational system, e.g., on the tow vessel.

While the foregoing is directed to exemplary embodiments, other and further embodiments may be devised through additional combination with features both disclosed herein or otherwise known in the art without departing from the basic scope of this disclosure and which may be encompassed by the claims that follow.

What is claimed is:

1. An apparatus comprising:
a positive buoyancy device;
a pair of control cables attached to the buoyancy device and extending from the buoyancy device to a submerged end;
a plurality of foil sections disposed along the control cables between the buoyancy device and the submerged end;
a linear actuator mounted at least partially within the positive buoyancy device and configured to adjust attack angles of the foil sections by changing a tension in one or both of the control cables; and
a controller configured to direct the linear actuator to adjust the tension in one or both of the control cables and thereby regulate lift generated by the plurality of foil sections.

2. The apparatus of claim 1, wherein the linear actuator is configured to change the tension by adjusting a length of one of the control cables.

3. The apparatus of claim 2, wherein the linear actuator is vertically disposed with respect to the control cables.

4. The apparatus of claim 1, wherein each of the foil sections defines a forward conduit adjacent to a leading edge of each foil section through which a first of the control cables extends and a rear conduit adjacent to a trailing edge of each foil section through which a second of the control cables extends.

5. The apparatus of claim 4, wherein the forward conduit and the rear conduit are spaced apart equidistantly apart in each of the plurality of foil sections.

6. The apparatus of claim 4, wherein the linear actuator is configured to adjust a length of the second control cable to thereby adjust the tension in the second control cable.

7. The apparatus of claim 1, wherein the pair of control cables are provided as a single cable that inflects at the submerged end to form the pair of control cables.

8. The apparatus of claim 1, wherein the submerged end is coupled to a cable configured to tow one or more seismic sources suspended from the positive buoyancy device.

9. The apparatus of claim 1, wherein the submerged end is coupled to a cable configured to tow a seismic streamer aft of the positive buoyancy device.

10. The apparatus of claim 1, wherein the controller is disposed within the positive buoyancy device and in data communication with the linear actuator.

11. The apparatus of claim 1, further comprising a navigational system in data communication with the controller, wherein the navigational system is configured to supply navigation data to the controller so that actuator commands are determined to steer the positive buoyancy device based on the lift.

12. The apparatus of claim 1, wherein the foil sections have substantially uniform, asymmetric foil geometries.

13. The apparatus of claim 1, wherein the foil sections have substantially non-uniform foil geometries configured to reduce lift in a mid-span region of the plurality of foil sections as compared to end regions proximate the positive buoyancy device and the submerged end.

14. A system comprising:
a surface or subsurface buoyancy device;
a forward control cable coupled to and extending beneath the buoyancy device;
an aft control cable coupled to and extending beneath the buoyancy device;
a linear actuator mounted at least partially within the buoyancy device, wherein the linear actuator is configured to adjust tension in the aft control cable with respect to the forward control cable;
a plurality of foil sections disposed along the forward and aft control cables, wherein:
the foil sections are configured to generate lift based on attack angles thereof; and
the attack angles of the foil sections vary as a function of the tension; and
a foil controller configured to direct the linear actuator to adjust tension in one or both of the forward and aft control cable and thereby regulate the lift generated by the plurality of foil sections.

15. The system of claim 14, wherein:
the linear actuator is vertically mounted in the buoyancy device; and
the system further comprises a sensor configured to sense tension in one or both of the forward and aft control cables.

16. The system of claim 15, further comprising the foil controller provided in the buoyancy device and configured to direct the linear actuator to adjust the tension in the aft control cable and thereby regulate lift generated by the plurality of foil sections.

17. A seismic array comprising:
a plurality of towed seismic sources; and
one or more dynamically controlled steering systems attached to the seismic sources, respectively, wherein each steering system comprises:
a buoyancy device;
a pair of control cables attached to the buoyancy device and extending downward from the buoyancy device to a submerged end;
a plurality of foil sections disposed along the control cables between the buoyancy device and the submerged end;
a linear actuator mounted at least partially within the buoyancy device and configured to adjust attack angles of the foil sections by changing a tension in one or both of the control cables; and a foil controller configured to direct the linear actuator to adjust tension in either or both of the control cables and thereby regulate lift generated by the plurality of foil sections.

18. A method of steering a seismic array, the array comprising:

a plurality of towed seismic devices; and one or more dynamically controlled steering systems attached to the seismic devices, respectively, wherein each steering system comprises:

a buoyancy device;

a forward control cable coupled to and extending beneath the buoyancy device;

an aft control cable coupled to and extending beneath the buoyancy device;

a plurality of foil sections disposed along the forward and aft control cables;

a linear actuator mounted at least partially within the buoyancy device, wherein the actuator is configured to adjust attack angles of the foil sections by changing a tension in one or both of the control cables; and a foil controller configured to direct the linear actuator to adjust the tension in either or both of the control cables and thereby regulate lift generated by the plurality of foil sections;

the method comprising:

transmitting data from the foil controller of one or more of the steering systems in order to instantiate a mode in the corresponding linear actuator; and causing the linear actuator to adjust tension in the aft control cable with respect to the forward control cable to generate lift for steering the corresponding buoyancy device and attached seismic devices.

19. The method of claim 18 further comprising:

transmitting data from the foil controller of one or more of the steering systems, wherein the data is configured to instantiate a minimum or maximum mode; and causing one or more of the actuators to move to a minimum or maximum detent in order to minimize or maximize the lift.

20. The method of claim 18 further comprising:

transmitting data from the foil controller of two or more selected ones of the steering systems, wherein the data is configured to instantiate a mode in the selected steering systems to equalize the tension in the respective aft control cables; and causing the respective linear actuators to exert equal tension on the respective aft control cables in the selected steering systems.

21. The method of claim 18 further comprising:

transmitting data from the foil controller of one or more of the steering systems, wherein the data is configured to instantiate a mode designating one of the steering systems as a master steering system; and causing the respective linear actuators to exert tension on the aft cables configured to orient the plurality of foil sections to maintain a fixed lateral separation distance between the buoyancy device of the master steering system and the buoyancy devices of others of the steering systems.

22. The method of claim 18 further comprising:

transmitting data from the foil controller of two or more selected ones of the steering systems, wherein the data is configured to instantiate a mode in the selected steering systems to maintain maximum lateral separation distance among the respective buoyancy devices of the selected steering systems; and causing the respective linear actuators to exert tension on the aft cables configured to orient the plurality of foil sections to maintain maximum lateral separation distance among the buoyancy devices of one or more adjacent steering systems.

23. The method of claim 18 further comprising:

transmitting data from the foil controller of one or more of the steering systems, wherein the data is configured to instantiate an independent steering mode including independent steering instructions for each of the buoyancy devices; and causing the linear actuators to exert tension on the aft cables configured to implement the respective, independent steering instructions for each respective buoyancy device.

24. The method of claim 18 further comprising:

transmitting data from the foil controller of one or more of the steering systems, wherein the data is configured to instantiate a mode designating one of the steering systems as a master steering system in the event of loss of communication therewith; and causing the master steering system to transmit data to the other steering systems.

25. The method of claim 18 further comprising:

transmitting data from the foil controller of one or more of the steering systems, wherein the data is configured to instantiate a mode to maintain a maximum lateral separation among the respective buoyancy devices based on tension in a tow line attached to one of the buoyancy devices being below a minimum threshold value; and causing the linear actuators to exert tension on the aft cables configured to orient the respective plurality of foil sections to maintain maximum lateral separation distance among the buoyancy devices of the steering systems when the tension in the tow line drops below the minimum threshold value.

26. The method of claim 18 wherein the one or more seismic devices are selected from any one or more of the following group: a seismic source device, a sub-array of seismic source devices, a seismic streamer cable, a paravane, or a diverter.

27. The apparatus of claim 1, wherein the pair of control cables comprises a forward control cable attached to the positive buoyancy device via a forward mount and further comprising a load cell or strain gauge configured to determine the tension in the forward control cable.

28. The apparatus of claim 1, wherein the linear actuator comprises a ram coupled to the aft control cable.

29. The apparatus of claim 28, further comprising:

a sensor configured to determine a position of the ram and a corresponding length and tension in the aft control cable; or a rotary sensor or encoder configured to determine the position of the ram by counting a number of revolutions of a screw shaft or other rotary drive component of the linear actuator.

* * * * *